US006453504B1

(12) United States Patent
Burkard et al.

(10) Patent No.: US 6,453,504 B1
(45) Date of Patent: Sep. 24, 2002

(54) POWER DRIVEN WIPER SYSTEM FOR OUTSIDE VEHICLE MIRRORS

(75) Inventors: C. Richard Burkard; Gary R. Leeth, both of Hillsboro, OH (US)

(73) Assignee: Rotron, Inc., Hillsboro, OH (US)

( * ) Notice: Subject to any disclaimer, the term of this patent is extended or adjusted under 35 U.S.C. 154(b) by 93 days.

(21) Appl. No.: 09/635,460

(22) Filed: Aug. 11, 2000

(51) Int. Cl.⁷ .................. B60S 1/60; B60S 1/16
(52) U.S. Cl. .............. 15/250.003; 15/250.19; 15/250.29; 15/250.01
(58) Field of Search ............. 15/250.003, 250.29, 15/250.19, 250.16, 250.002, 250.001, 250.01

(56) References Cited

U.S. PATENT DOCUMENTS

| | | | | |
|---|---|---|---|---|
| 2,306,980 A | * | 12/1942 | Roberts | 15/250.19 |
| 3,837,032 A | * | 9/1974 | Ulbrich | 15/250.29 |
| 3,855,661 A | | 12/1974 | Prince | |
| 4,763,381 A | | 8/1988 | Williams | |
| 4,873,740 A | | 10/1989 | Vahrenwald et al. | |
| 5,157,551 A | | 10/1992 | Spence | |
| 5,315,735 A | * | 5/1994 | I-Shin | 15/250.29 |
| 5,513,412 A | * | 5/1996 | Longazel | 15/250.19 |
| 5,522,112 A | * | 6/1996 | Tiffany, III | 15/250.003 |
| 5,551,116 A | * | 9/1996 | DeKelaita | 15/250.19 |
| 6,161,247 A | * | 12/2000 | Breau et al. | 15/250.003 |

FOREIGN PATENT DOCUMENTS

| | | | | |
|---|---|---|---|---|
| GB | 2173995 | * | 10/1986 | 15/250.29 |
| JP | 63-112247 | * | 5/1988 | 15/250.29 |

* cited by examiner

Primary Examiner—Gary K. Graham
(74) Attorney, Agent, or Firm—Jacox, Meckstroth & Jenkins

(57) ABSTRACT

An exterior rear view mirror is wiped by a flexible blade supported by a pivotal arm mounted on a carriage supported for linear movement on a track mounted on a housing attached to the mirror. A shuttle is supported within the housing for reciprocating vertical movement by a motor driven reversing lead screw, and a magnetic coupling connects the shuttle to the carriage with the housing extending therebetween. A cam and follower lift and reset the arm and blade relative to the mirror in response to movement of the carriage at the top of the mirror, and the track and housing are each formed from a non-magnetic material so that the shuttle moves the carriage by a magnetic field.

17 Claims, 5 Drawing Sheets

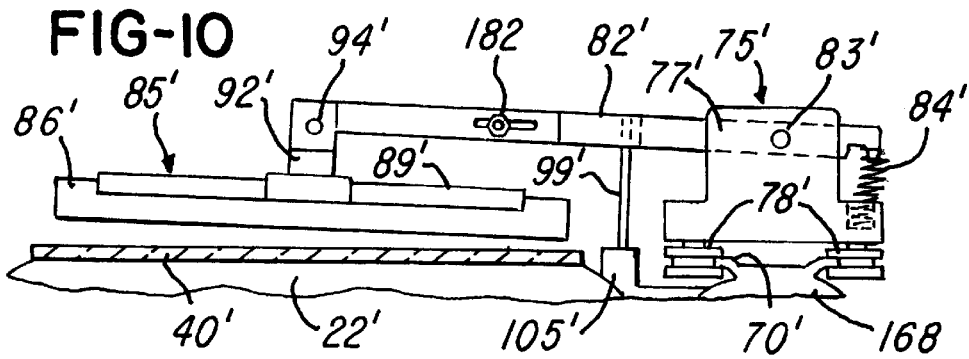
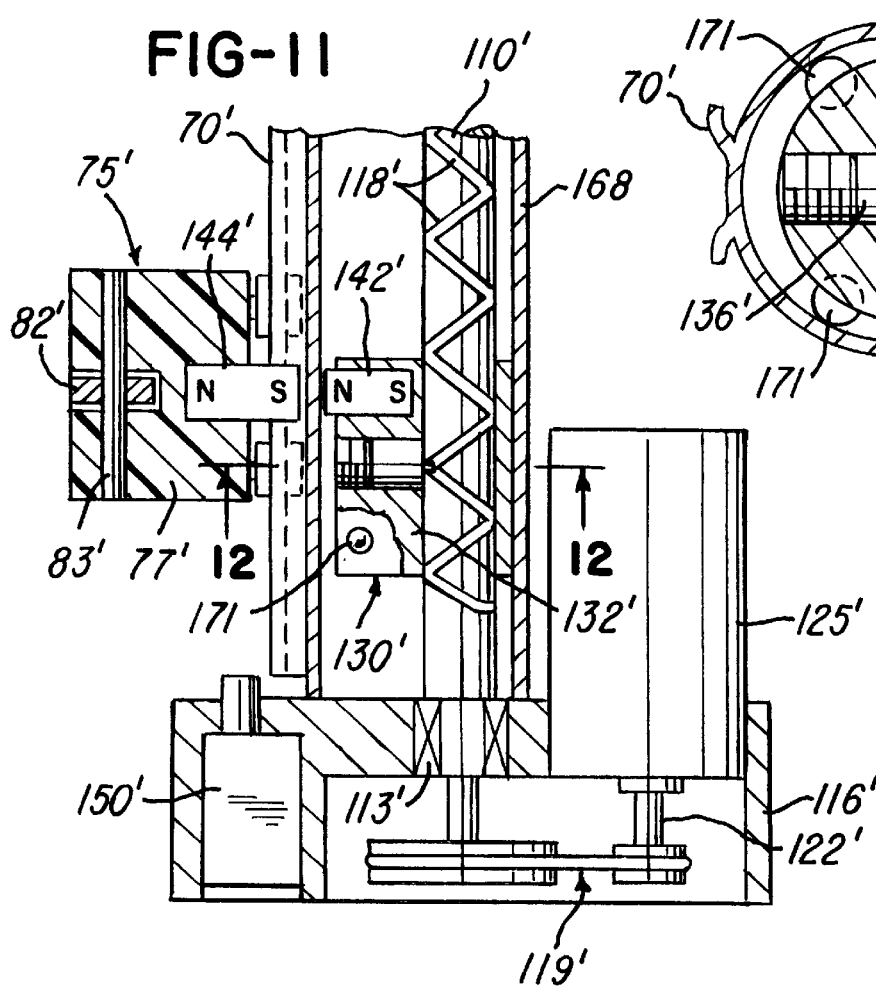

POWER DRIVEN WIPER SYSTEM FOR OUTSIDE VEHICLE MIRRORS

BACKGROUND OF THE INVENTION

This invention relates to a wiper system for an exterior rear view mirror used on motor vehicles and is particularly adapted for such mirrors used on trucks and buses. Various types of wiper systems have been proposed or used, for example, wiper systems with laterally or horizontally moving wiper blades are disclosed in U.S. Pat. Nos. 3,855,661 and 4,763,381, and wiper systems with vertically moving wiper blades are disclosed in U.S. Pat. Nos. 4,873,740, 5,157,511 and 5,522,112. With any such wiper system, it is desirable for the wiper blade to clean or wipe substantially the entire front surface of the rear view mirror and to be constructed so that the wiper system would not be damaged in the event the wiper blade becomes frozen to the mirror. It is also desirable for the wiper system to be dependable in operation regardless of weather conditions and for the wiper blade to be normally stored in a position where it does not interfere with normal use of the mirror. It is also important for the wiper blade to wipe and clean the mirror surface during each stroke of the blade without water following the blade.

SUMMARY OF THE INVENTION

The present invention is directed to an improved wiper system which provides all of the desirable features mentioned above and which is constructed either as an integral part of the vehicle mirror unit or as a separate attachment for the mirror unit. In accordance with one embodiment of the invention, the wiper system is partially enclosed within a non-magnetic stainless steel housing which supports a vertical rectangular mirror. A formed non-magnetic stainless steel track is attached to the housing and supports a carriage for vertical movement adjacent one side of the mirror. The carriage pivotally supports one end portion of a horizontal wiper arm, and a wiper blade unit is pivotally supported by the opposite end portion of the arm. A torsion spring biases the arm and wiper blade towards the surface of the mirror.

A vertical drive or lead screw with reversing helical grooves is supported within the housing and is rotated by a DC permanent magnet motor through a belt drive. A shuttle is mounted on the lead screw for vertical reciprocating movement, and the shuttle and the carriage support an opposing set of magnets with the track and housing extending between the opposing magnets. The carriage, wiper arm and wiper blade are thus moved up and down the track with the wiper blade contacting the mirror in response to vertical reciprocating movement of the shuttle and through a magnetic coupling.

A cam member is mounted on the upper portion of the housing and is engaged by a cam lift finger pivotally connected to the wiper arm. As the wiper blade moves upwardly to the upper end of its stroke, the cam member lifts the wiper blade from the mirror and resets the blade back onto the mirror after the blade moves up slightly. This assures that the water carried by the wiper blade on the upstroke is then carried by the wiper blade on the downstroke. In a second embodiment, the wiper system of the invention is constructed for attachment to an existing rear view mirror mounted on a motor vehicle. In this embodiment, the housing surrounding the lead screw and shuttle may be formed from a non-metallic stainless or aluminum or a plastics material.

Other features and advantages of the invention will be apparent from the following description, the accompanying drawings and the appended claims.

BRIEF DESCRIPTION OF THE DRAWINGS

FIG. 10 is a fragmentary section similar to FIG. 9 and showing the wiper blade lifted from the mirror at the upper end portion of its stroke;

FIG. 11 is a fragmentary section taken generally on the line 11—11 of FIG. 8; and FIG. 12 is an enlarged fragmentary section taken generally on the line 12—12 of FIG. 11.

DESCRIPTION OF THE PREFERRED EMBODIMENTS

Figure 1:
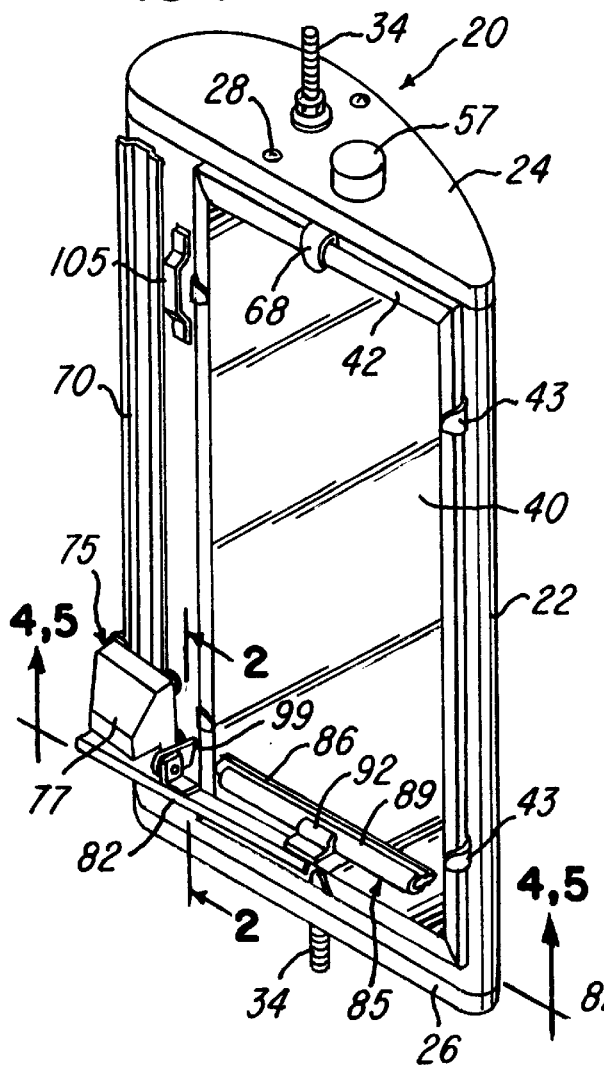
FIG. 1 is a perspective view of a motor vehicle mirror unit incorporating a wiper system constructed in accordance with the invention.
Figure 2:
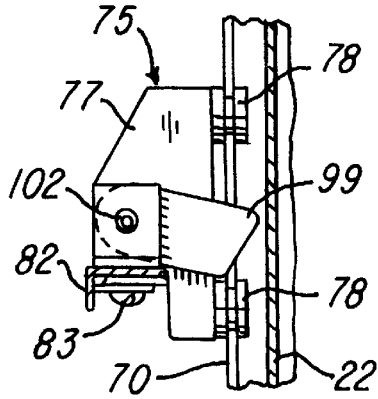
FIG. 2 is a fragmentary section taken generally on the line of 2—2 of FIG. 1.
Figure 3:
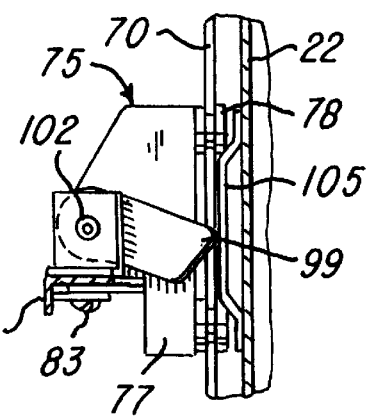
FIG. 3 is a fragmentary section similar to FIG. 2 and taken when the wiper blade is at the upper end portion of its stroke.

Referring to FIG. 1, a mirror and a wiper unit or assembly 20 includes a housing 22 having a cross-sectional configuration generally in the shape of an airfoil and preferably formed of non-magnetic stainless steel sheet metal. However, the housing could be formed from an extrusion of aluminum or rigid plastics material. An upper end cap 24 and a lower end cap 26 are attached to the upper and lower ends of the housing 22 by a corresponding pair of screws 28 (FIG. 7) threaded into corresponding angle tabs or brackets 31 secured or spot welded to the inner surface of the housing 22. A threaded bolt 34 projects upwardly from the top end cap 24, and another bolt 34 projects downwardly from the bottom end cap 26 and are used to mount the unit or assembly 20 on a bracket projecting from the door or body of a motor vehicle such as a truck or bus. A rear surface rectangular mirror 40 is enclosed by a rectangular stainless steel frame 42 and is attached to the rear surface of the housing 22 by a set of bent tabs 43 which are spot welded to the rear wall of the housing. A flat etched foil heater plate 45 is sandwiched between the mirror 40 and the rear wall of the housing 22 and has a pair of electrical conductors 47 which project into the housing 22 through an opening 48 within the rear wall of the housing. The heater plate 45 is produced by several manufacturers, with one manufacturer being Thermal Circuits, Inc.

A container 52 molded of rigid plastics material such as high density polyethylene, is supported within the housing 22 by a threaded tubular neck 53 which projects through a hole 56 in the top end cap 24 and receives a closure cap 57. The container 52 encloses a supply of cleaning solution which is dispensed from the container by a solenoid actuated pump 60. When the pump 60 is actuated, the cleaning solution is pumped through a flexible tube 62 which is connected to a metal tube 64 having a rearward end portion 66 projecting over the upper edge of the mirror frame 42 under a stainless steel cover tab 68 (FIG. 1). The cleaning solution is sprayed from the end portion 66 of the tube 64 onto the top edge portion of the mirror 40.

Figure 4:
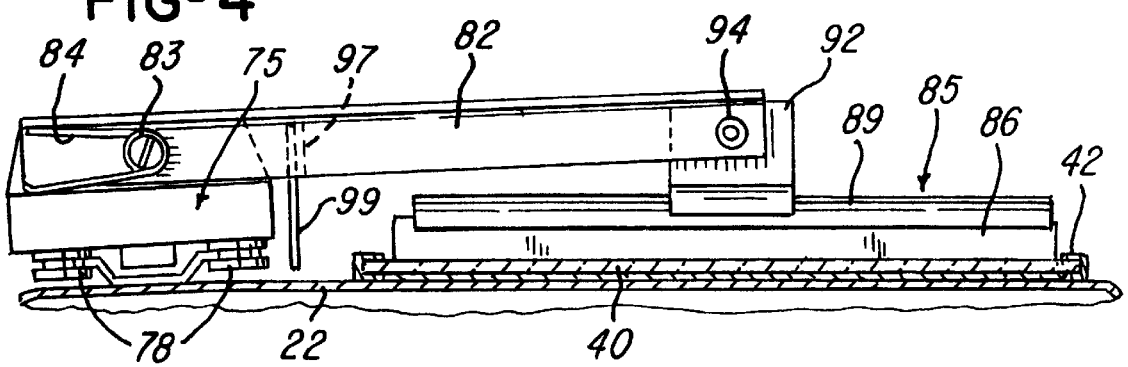
FIG. 4 is a fragmentary section taken generally on the line 4—4 of FIG. 1.
Figure 5:
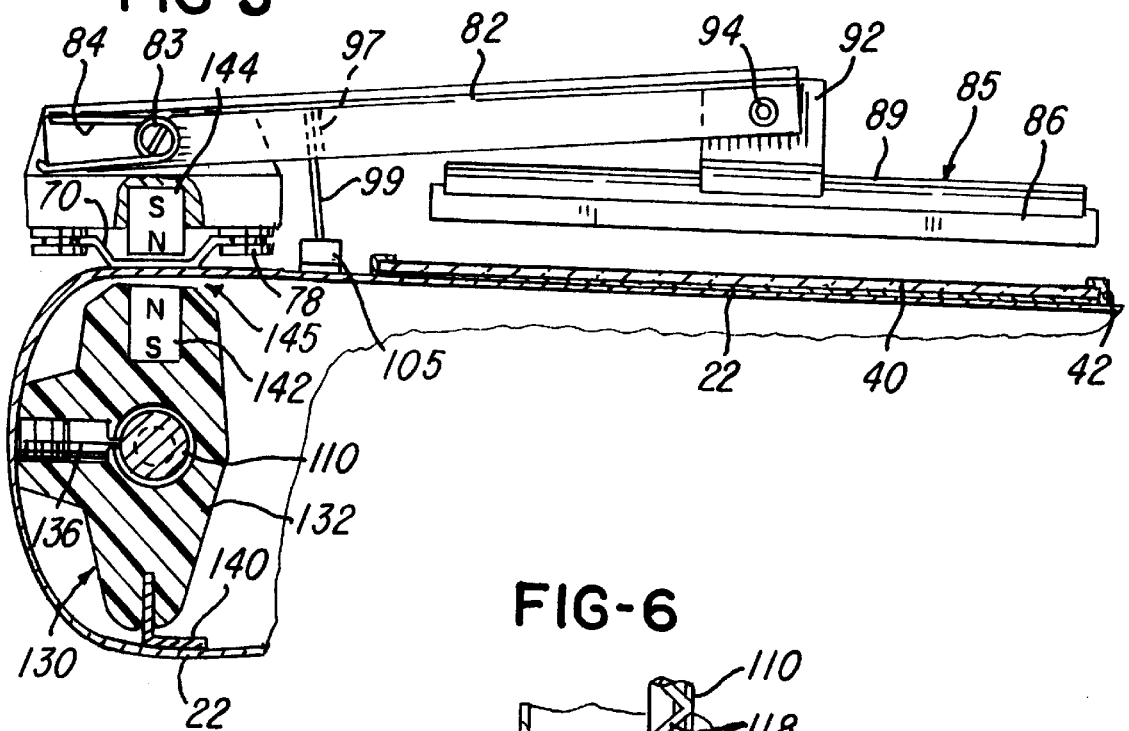
FIG. 5 is a fragmentary section similar to FIG. 4 and taken when the wiper blade is at the upper end portion of its stroke.

A vertical non-magnetic track 70 is preferably formed of non-magnetic stainless sheet steel and is attached by spot welds to the rear wall of the housing 22 parallel to a longitudinal section of the mirror frame 42. As shown in FIG. 5, the track 70 has a cross-sectional configuration similar to that of a pie pan. A carriage 75 is supported by the track 70 for linear or vertical movement and includes a carriage body 77 preferably molded of a rigid plastics material. A set of four spool-like wheels or rollers 78 are mounted on the carriage body 77 and engage the opposite longitudinal edge portions of the track 70 to support the carriage for low friction movement along the track. The carriage body 77 has a recess which receives one end portion of a wiper arm 82 (FIG. 4), preferably formed of stainless steel and having an angular cross-sectional configuration. The wiper arm 82 is pivotally supported by a pivot screw 83, and a torsion spring 84 normally urges the wiper arm 82 towards the front surface of the mirror 40.

A mirror wiper unit or assembly 85 includes a flexible and resilient wiper blade 86 which is supported by a U-shaped wiper blade frame 89, preferably formed of stainless sheet metal. A stainless sheet metal bracket 92 is secured or spot welded to the blade frame 89 and is pivotally connected to the opposite end portion of the wiper arm 82 by a pivot pin or rivet 94. An L-shaped stainless steel bracket 97 (FIG. 1) is attached or spot welded to the wiper arm 82 and supports a pivotal finger or cam follower 99 attached by a pivot pin or rivet 102. When the carriage 75, wiper arm 82 and wiper blade unit 85 travel up the track 70, the follower 99 engages a lifter block or cam member 105 attached to the rear wall of the housing 22 by spot welding. The follower 99 rides up and over the lifter block or cam member 105, as shown in FIG. 5, to lift the wiper blade 86 from the mirror 40 and then lower the blade 86 back onto the mirror 40 at the top end of the mirror and at the top end of the stroke of the carriage 75. When the carriage 75 moves down the track 70, the lift finger or follower 99 pivots upwardly and rides freely over the lifter block or cam member 105 so that the wiper blade 86 remains in contact with the mirror 40 during the downstroke of the carriage 75.

Figure 6:
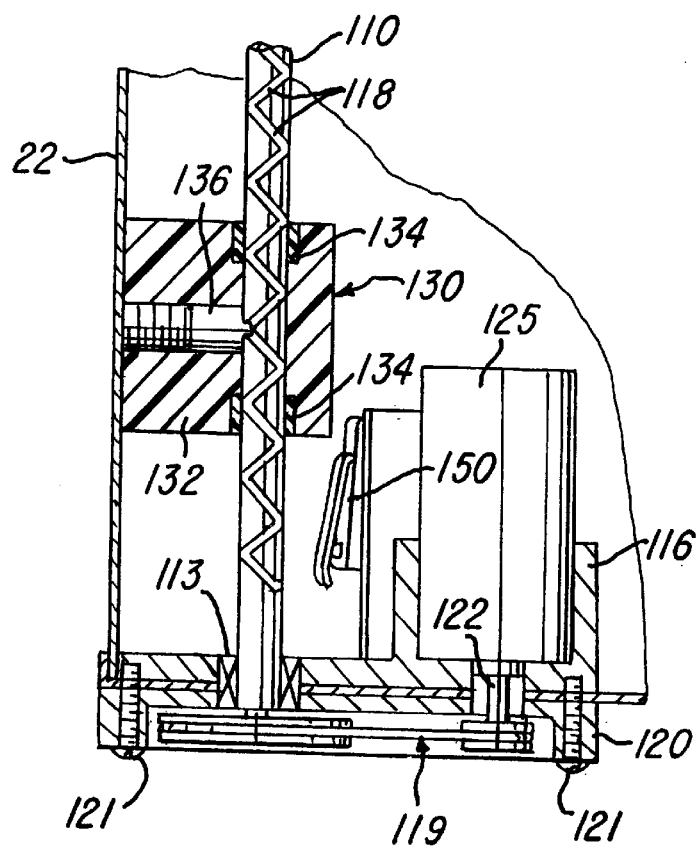
FIG. 6 is a fragmentary section showing the shuttle drive mechanism for the wiper blade carriage in accordance with the invention.
Figure 7:
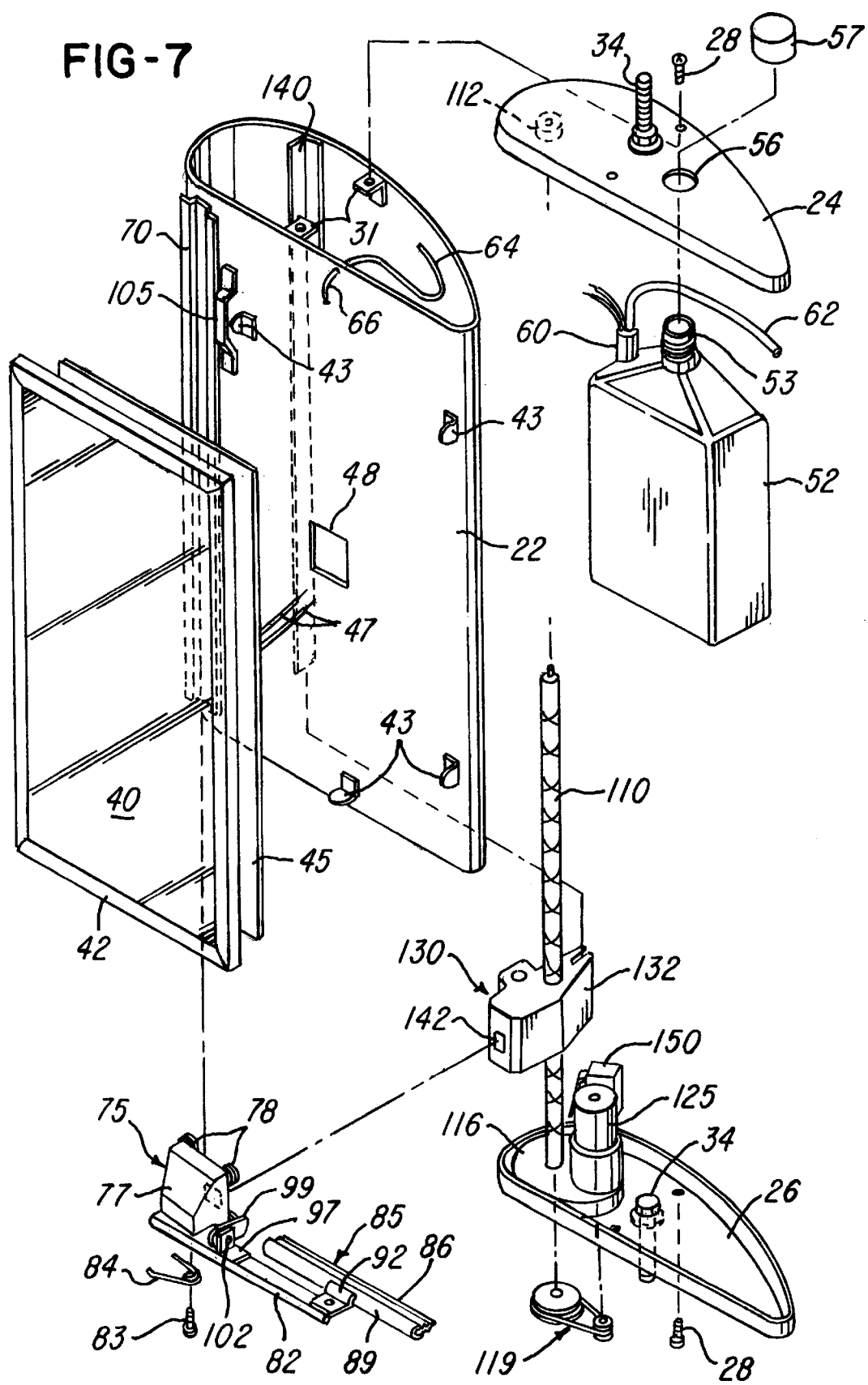
FIG. 7 is an exploded perspective view of the wiper system shown in FIGS. 1–6.

Referring to FIGS. 5–7, a drive shaft or lead screw 110 is supported for rotation within one end portion of the housing 22 by a bearing 112 (FIG. 7) attached to the upper end cap 24 and a lower bearing 113 (FIG. 6) supported within a base housing section 116, preferably molded of a rigid plastics material. The screw 110 has reversing double helical grooves 118, and a lower end portion of the screw shaft 110 is rotated by a belt drive 119 enclosed within a base housing section 120 having a bottom cover (not shown). The housing sections 116 and 120 are secured to the bottom end cap 26 by screws 121. The lead screw 110 is driven by an output shaft 122 projecting downwardly from a 12 volt DC permanent magnet motor 125. One acceptable manufacturer for the motor 125 is Pittman—Division of Penn Engineering in Harleysville, Pa. While a single belt drive 119 is shown in FIGS. 6 and 7, a multiple belt drive may also be used to provide greater torque transmission.

As also shown in FIGS. 5–7, a shuttle 130 is mounted on the drive screw 110 for vertical reciprocative movement and includes a shuttle body 132 which is preferably molded of a rigid plastics material and has counterbores which receive bushings 134, preferably formed of nylon. A follower pin 136 is threaded into the shuttle body 132 and has a center pin which projects into the reversing grooves 118 so that the shuttle 130 reciprocates up and down on the screw shaft 110 in response to rotation of the shaft in a single direction by the motor 125. Referring to FIG. 5, the shuttle 130 has a vertical slot which receives a stabilizing angle or track 140 attached to the front inner wall of the housing 22 by spot welds, as shown in FIG. 7. As also shown in FIG. 5, the shuttle body 132 supports a permanent magnet 142, and an opposing permanent magnet 144 is carried by the carriage body 77 to form a magnetic coupling 145. Preferably, the magnets 142 and 144 are arranged with common adjacent poles so that the magnets are in repelling relation. As a result of this magnetic coupling and the magnetic field, the shuttle 130 pushes or forces the carriage 75 up the track 70 as the shuttle moves up the screw shaft 110 and pushes or forces the carriage 75 down the track as the shuttle 130 moves down the screw shaft 110.

In operation of the wiper system described above in connection with FIGS. 1–7, when it is desired to clean or wipe the front surface of the mirror 40 due to rain or after spraying the mirror surface with a cleaning solution pumped from the container 52, the motor 125 is energized with a switch within the vehicle body, causing the shuttle 130 to move upwardly on the shaft 110 from its bottom storage position where the shuttle 130 engages a shut-off switch 150 for the motor 125. As the shuttle 130 moves upwardly on the screw shaft 110, the magnetic coupling forces the carriage 75 and the wiper blade assembly 85 up the front surface of the mirror 40 so that the blade 86 wipes the surface. As the carriage 75 approaches the upper end of its stroke, the wiper blade 86 is lifted from the mirror surface by the follower 99 camming over the block 105, as described above, so that any water on the top side of the blade 86 is released. At the upper end of the stroke for the carriage 75, the wiper blade reseats on the mirror surface. Thus the surface is wiped again on the downward stroke of the carriage 75 as the carriage is forced down the track 70 by the downward movement of the shuttle 130. At the bottom end of the stroke, the shuttle 130 actuates the switch 150. If the switch within the vehicle body has been shut off, the motor 125 stops. If the switch within the vehicle body remains on, the wiping cycle continues and repeats for again wiping the outer surface of the mirror 40.

FIGS. 8–11 illustrate another embodiment of a wiper system constructed in accordance with the invention and wherein the wiper system is attached to an existing rear view mirror unit or assembly 160. In the embodiment shown in FIGS. 8–11, a wiper system 165 is attached to the existing mirror assembly 160 and is constructed substantially the same as the integrated mirror and wiper system described above in connection with FIGS. 1–7. Accordingly, the same reference numbers are used to identify corresponding components but with the addition of prime marks. In addition, the wiper assembly or system 165 includes the housing 168 which may be formed from an extrusion of a non-magnetic metal such as aluminum, but may also be formed of a rigid plastics material. The housing 168 includes an integrally formed track 70' for supporting a carriage 75' for linear movement along the track.

The wiper system 165 includes a shuttle 130' having an aluminum body 132' supported for linear movement within the tubular housing 168 on a drive screw 110'. A set of four steel ball bearings 171 are carried by the shuttle body 132', and a set of opposing magnets 142' and 144' are carried by the shuttle body 132' and the carriage body 77'. However, as shown in FIG. 11, the magnets 142' and 144' are arranged with adjacent unlike poles so that the magnets attract each other to form a magnetic coupling 145' between the carriage 75' and shuttle 130'. The ball bearings 171 provide for free movement of the shuttle 130' and prevent rubbing of the shuttle on the inner surface of the tubular housing 168. Thus when the shuttle 130' is reciprocated on the drive screw 110', the shuttle pulls with it the carriage 75' causing the wiper blade 86' to wipe the outer surface of the mirror 40'.

Figure 8:
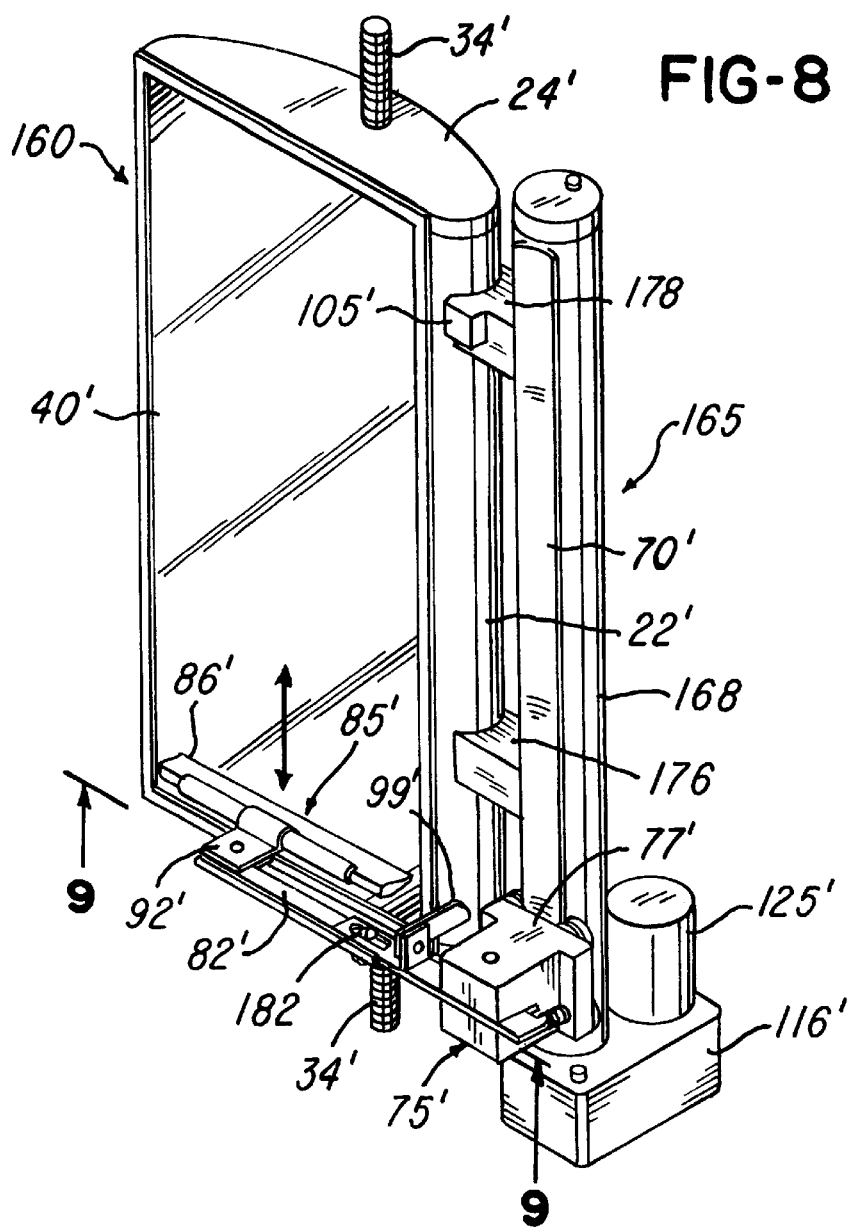
FIG. 8 is a perspective view of another embodiment of a wiper system constructed in accordance with the invention and in the form of an attachment unit.
Figure 9:
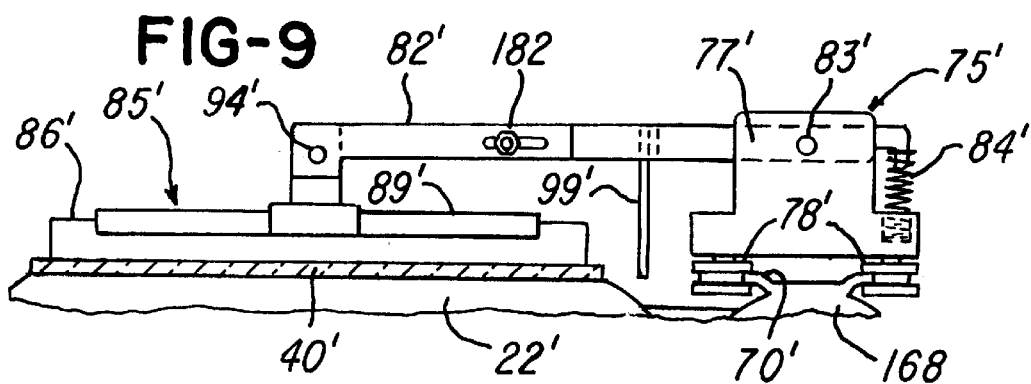
FIG. 9 is a fragmentary section taken generally on the line 9—9 of FIG. 8.

As shown in FIG. 8, the housing 168 is attached to the mirror housing 22' by a set of vertically spaced attachment brackets or spacer blocks 176 and 178, and the block 178 includes an integral lifter block 105' for engagement by a pivotally supported cam finger or follower 99' carried by a wiper arm 82'. As also shown in FIGS. 8–10, the wiper arm 82' is constructed in two sections which are slidably adjustable and are secured together by an adjustment bolt 182. This adjustment provides for mounting the wiper assembly or system 165 on existing mirror units 160 of different manufactures and having different width mirrors 40'. The wiper system 165 operates in the same manner as the wiper system described above in connection with FIGS. 1–7.

From the drawings and the above description, it is apparent that a mirror wiper system constructed in accordance with the invention provides desirable features and advantages. As one advantage, the magnetic coupler between the shuttle 130 or 130' and the carriage 75 or 75' permit the motor driven shuttle to continue operating in the event the wiper blade 86 or 86' is frozen to the mirror since the shuttle will pull away from the carriage. This prevents stalling of the motor and a motor burnout. The magnetic coupling 145 or 145' also eliminates any sliding seals within the housing 22 or 168 and thereby eliminates any drag on movement of the wiper blade support carriage due to the seals. As another feature, the lift-off mechanism, including the pivotal cam finger 99 or 99' and the lift off cam block 105 or 105', and the reset of the blade back unto the mirror at the upper end of the blade stroke, assures that any water on the mirror above the blade during the upstroke of the blade is wiped downwardly during the downstroke of the blade. Thus the mirror is wiped clean during both the upstroke and the downstroke of the carriage. The arrangement of the components forming the wiper system also provides for economically producing a self-contained mirror and wiper assembly as disclosed in connection with FIGS. 1–7 and in the form of an attachment wiper system for a mirror assembly as disclosed in connection with FIGS. 8–12.

While the forms of mirror wiper system herein described constitute preferred embodiments of the invention, it is to be understood that the invention is not limited to these precise forms, and that changes may be made therein without departing from the scope and spirit of the invention as defined in the appended claims.

What is claimed is:

1. A motor vehicle exterior mirror and wiper system, comprising a generally vertical mirror, a wiper blade positioned adjacent said mirror, an elongated generally vertical track positioned adjacent said mirror, a blade support carriage mounted on said track for linear movement and supporting said blade for wiping an outer surface of said mirror, a shuttle supported for linear movement substantially parallel to said track, a power operated drive connected to reciprocate said shuttle, a magnetic coupler magnetically connecting said shuttle to said carriage for moving said carriage and said blade in response to movement of said shuttle, a housing enclosing said shuttle and said power operated drive, and said housing having a non-magnetic portion extending between said shuttle and said carriage.

2. A system as defined in claim 1 wherein said housing has an outer surface supporting said mirror, and a container for a mirror cleaning solution enclosed within said housing.

3. A system as defined in claim 1 wherein said housing comprises a non-magnetic sheet of stainless steel.

4. A system as defined in claim 1 wherein said elongated track comprises a non-magnetic stainless steel track having opposite longitudinal parallel edge portions, and said carriage engages said edge portions of said track.

5. A system as defined in claim 1 and including an arm having one end portion pivotally connected to said blade and an opposite end portion pivotally connected to said carriage, a spring urging said arm and said blade toward said outer surface of said mirror, and a cam and follower positioned to lift said arm and said blade from said outer surface of said mirror in response to movement of said carriage.

6. A system as defined in claim 1 wherein said power operated drive comprises a lead screw having reversing pitch helical grooves, and said shuttle comprises a body confining at least one wear bushing receiving said screw.

7. A system as described in claim 1 wherein said magnetic coupler comprises adjacent common pole permanent magnets on said shuttle and on said carriage for pushing said carriage by said shuttle along said track by magnetic propulsion.

8. A system as defined in claim 1 and including a lift-off member adjacent an upper end portion of said track for temporary lifting said blade from said outer surface of said mirror and for resetting said blade on said outer surface of said mirror.

9. A wiper system as defined in claim 1 wherein said shuttle comprises a shuttle body of rigid plastics material, and said magnetic coupler includes a permanent magnet supported by said shuttle body.

10. A wiper system as defined in claim 1 wherein said carriage comprises a carriage body of rigid plastics material, and said magnetic coupler includes a permanent magnet supported by said carriage body.

11. A wiper system as defined in claim 1 wherein said track comprises a non-magnetic stainless steel track disposed between said shuttle and said carriage.

12. A motor vehicle exterior mirror and wiper system, comprising a generally vertical mirror, a wiper blade positioned adjacent said mirror, an elongated generally vertical track positioned adjacent said mirror, a blade support carriage mounted on said track for linear movement and supporting said blade for wiping an outer surface of said mirror, an arm having one end portion pivotally connected to said blade and an opposite end portion pivotally connected to said carriage, a spring urging said arm and said blade toward said outer surface of said mirror, a motor operated drive connected to reciprocate said carriage on said track, a lift-off member adjacent an upper end portion of said track for temporarily lifting said blade from said outer surface of said mirror and for resetting said blade back onto said outer surface of said mirror, said lift-off member including a cam and follower positioned to lift said arm and said blade from said outer surface of said mirror in response to movement of said carriage.

13. A wiper system as defined in claim 12 wherein said motor operated drive comprises a lead screw having reversing pitch helical grooves, and a shuttle including a body confining at least one wear bushing receiving said screw.

14. A motor vehicle exterior mirror and wiper system, comprising a generally vertical mirror, a wiper blade positioned adjacent said mirror, an elongated generally vertical track positioned adjacent said mirror, a blade support carriage mounted on said track for linear movement and supporting said blade for wiping an outer surface of said mirror, a shuttle supported for linear movement substantially parallel to said track, a power operated drive connected to reciprocate said shuttle, a magnetic coupler including permanent magnets on said shuttle and said carriage for moving said carriage and said blade in response to movement of said shuttle, a lift-off member adjacent an upper end portion of said track for temporary lifting said blade from said outer surface of said mirror and for resetting said blade back onto said outer surface of said mirror, a non-magnetic housing enclosing said shuttle and said power operated drive, and said housing extends between said shuttle and said carriage.

15. A wiper system as defined in claim 14 wherein said elongated track comprises a non-magnetic stainless sheet steel track having opposite longitudinal parallel edge portions, and said carriage engages said edge portions of said track.

16. A wiper system as defined in claim 14 and including an arm having one end portion pivotally connected to said blade and an opposite end portion pivotally connected to said carriage, a spring urging said arm and said blade toward said outer surface of said mirror, and said lift-off member includes a cam and follower positioned to lift said arm and said blade from said outer surface of said mirror in response to movement of said carriage.

17. A wiper system as defined in claim 14 wherein said power operated drive comprises an electric motor driven lead screw having reversing pitch helical grooves, and said shuttle comprises a body of plastics material and confines one of said permanent magnets.

\* \* \* \* \*